United States Patent
Han et al.

(10) Patent No.: US 10,933,859 B2
(45) Date of Patent: Mar. 2, 2021

(54) APPARATUS AND METHOD FOR CONTROLLING ENERGY REGENERATION VARIABLY

(71) Applicants: HYUNDAI MOTOR COMPANY, Seoul (KR); KIA MOTORS CORPORATION, Seoul (KR)

(72) Inventors: Soo-Lim Han, Hwaseong-si (KR); Seung-Jae Yoo, Hwaseong-si (KR); Ja-Chun Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 16/200,442

(22) Filed: Nov. 26, 2018

(65) Prior Publication Data
US 2019/0344778 A1 Nov. 14, 2019

(30) Foreign Application Priority Data
May 9, 2018 (KR) .................. 10-2018-0053097

(51) Int. Cl.
*B60W 20/14* (2016.01)
*B60W 10/08* (2006.01)
(Continued)

(52) U.S. Cl.
CPC .............. *B60W 20/14* (2016.01); *B60K 6/26* (2013.01); *B60W 10/08* (2013.01); *B60W 10/18* (2013.01);
(Continued)

(58) Field of Classification Search
CPC ......... B60K 6/26; B60W 10/18; B60W 20/14; B60W 2400/00; B60W 2540/12; B60W 2554/00; B60W 2554/801; B60W 2554/2554; B60W 2554/804; B60W 2556/50; B60W 2710/08; B60W 2710/18; B60W 30/09; B60W 30/18127; B60W 50/0097; B60Y 2200/92; B60Y 2300/18066; B60Y 2300/18125
See application file for complete search history.

(56) References Cited

U.S. PATENT DOCUMENTS 5,318,355 A * 6/1994 Asanuma ............... B60T 8/267
303/3
10,439,456 B2 * 10/2019 Reddy .................... H02K 1/246
(Continued)

FOREIGN PATENT DOCUMENTS

| KR | 2005-0065047 A | 6/2005 |
|----|----------------|--------|
| KR | 2008-0015454 A | 2/2008 |
| KR | 2015-0001546 A | 1/2015 |

*Primary Examiner* — Tyler J Lee
(74) *Attorney, Agent, or Firm* — Morgan, Lewis & Bockius LLP

(57) ABSTRACT

An apparatus for controlling energy regeneration variably capable of performing a variable control based on a deceleration event discrimination using a map information input as well as a driver's operation may include a controller configured to change a preset energy regeneration stage variably to a corresponding regenerative braking control by sensing an event for an energy regeneration stage and perform the corresponding regenerative braking control, and a generator configured to generate power according to the regenerative braking control.

20 Claims, 5 Drawing Sheets

(51) Int. Cl.
*B60W 10/18* (2012.01)
*B60K 6/26* (2007.10)

(52) U.S. Cl.
CPC ... *B60W 2400/00* (2013.01); *B60W 2554/801* (2020.02); *B60W 2554/804* (2020.02); *B60W 2710/08* (2013.01); *B60W 2710/18* (2013.01); *B60Y 2200/92* (2013.01); *B60Y 2300/18066* (2013.01); *B60Y 2300/18125* (2013.01)

(56) References Cited

U.S. PATENT DOCUMENTS

| | | | | |
|---|---|---|---|---|
| 2009/0066273 A1* | 3/2009 | Dunn | ............... | B60L 50/40 |
| | | | | 318/376 |
| 2017/0310171 A1* | 10/2017 | Reddy | ............... | H02K 3/18 |
| 2018/0056790 A1* | 3/2018 | Symanow | ......... | B60W 10/184 |

\* cited by examiner

APPARATUS AND METHOD FOR CONTROLLING ENERGY REGENERATION VARIABLY

CROSS-REFERENCE TO RELATED APPLICATION

This application is based on and claims the benefit of priority to Korean Patent Application No. 10-2018-0053097 filed on May 9, 2018, which is incorporated herein by reference in its entirety.

TECHNICAL FIELD

Exemplary embodiments of the present disclosure relate to an energy regeneration technology, and more particularly, to an apparatus and a method for controlling energy regeneration variably by using map information.

BACKGROUND

In the case of an electric vehicle, a paddle shift is applied. Energy regeneration is controlled based on "+" input and "−" input operations of the paddle shift. In addition, a driver himself/herself is aware of traveling situations during coasting to control the desired regeneration stage, thereby controlling a deceleration by regenerative braking.

However, in the case of the above method, since the paddle shift is operated only by the driver input, the regeneration stage is reflected manually. Therefore, there is a disadvantage in that the above method depends only on the driver's operation.

SUMMARY

An embodiment of the present disclosure is directed to an apparatus and a method for controlling energy regeneration variably capable of performing a variable control based on a deceleration event discrimination using a map information input as well as a driver's operation.

Another embodiment of the present disclosure is directed to an apparatus and a method for controlling energy regeneration variably while minimizing a paddle shift input, accelerator pedal sensor (APS), and brake operations.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

To accomplish the above objects, the present disclosure provides an apparatus for controlling energy regeneration variably capable of performing variable control based on a deceleration event discrimination using a map information input as well as an operation of a driver.

In accordance with an embodiment of the present disclosure, the apparatus for controlling energy regeneration variably includes: a controller configured to change a preset energy regeneration stage variably to a corresponding regenerative braking control by sensing an event for an energy regeneration stage and perform the corresponding regenerative braking control; and a generator configured to generate power according to the regenerative braking control.

The event may be an upward event that upwardly moves the energy regeneration stage or a downward event that downwardly moves the energy regeneration stage.

During the upward event, the energy regeneration stage may vary when a predicted collision time during coasting is smaller than a preset reference value.

The predicted collision time may be determined by using a vehicle-to-vehicle speed representing a difference between a speed preset by a specific object and a vehicle speed and a vehicle-to-vehicle distance representing a distance between the specific object and the vehicle.

The predicted collision time may be determined by using a vehicle-to-vehicle speed representing a speed difference between a specific vehicle speed and a vehicle speed which is preset by the event and a vehicle-to-vehicle distance representing a distance between occurrence information of the event and location information of the vehicle.

The specific object may be a speed camera or a speed bump.

The specific object may be a specific object on map information acquired by a communication terminal or a specific object acquired by a sensor.

The generator may be a generator or a driving motor.

The energy regeneration stage may vary by reflecting an adjustment value according to an operation of a paddle shifter for manually adjusting the energy regeneration stage.

The controller may control the vehicle to travel at a preset specific limit vehicle speed when the event is sensed.

In accordance with another embodiment of the present disclosure, a method for controlling energy generation variably includes: changing, by a controller, a preset energy regeneration stage variably to a corresponding regenerative braking control by sensing an event for an energy regeneration stage and performing the corresponding regenerative braking control; and generating, by a generator, power according to the regenerative braking control.

DETAILED DESCRIPTION

Figure 1:
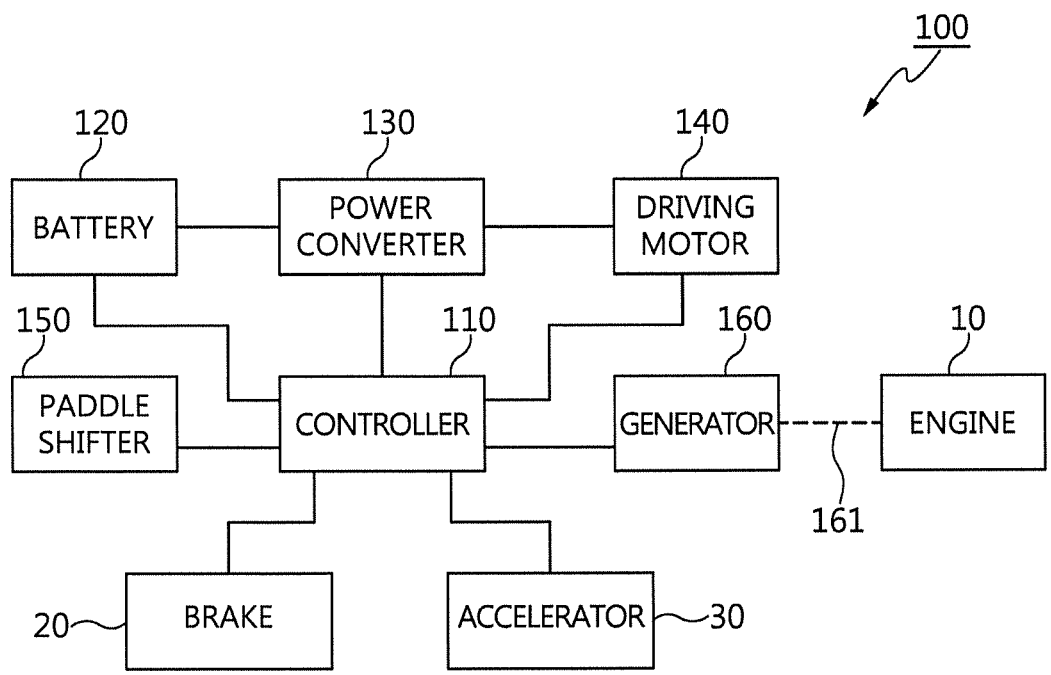
FIG. 1 is a configuration block diagram of an apparatus for controlling energy regeneration variably according to an embodiment of the present disclosure.

Terms and words used in the present specification and claims are not to be construed as a general or dictionary meaning but are to be construed as meaning and concepts meeting the technical ideas of the present disclosure based on a principle that the inventors can appropriately define the concepts of terms in order to describe their own inventions in best mode. Therefore, the configurations described in the embodiments and drawings of the present disclosure are merely most preferable embodiments but do not represent all of the technical spirit of the present disclosure. Thus it should be understood that there may exist various equivalents and modifications for substituting those at the time of filing this application. Moreover, detailed descriptions related to well-known functions or configurations will be omitted in order not to unnecessarily obscure the gist of the present disclosure. Hereinafter, preferred embodiments of the present disclosure will be described in detail with reference to the accompanying drawings.

Since the present disclosure may be variously modified and have several exemplary embodiments, specific exemplary embodiments will be shown in the accompanying drawings and be described in detail in a detailed description. However, it is to be understood that the present disclosure is not limited to the specific exemplary embodiments, but includes all modifications, equivalents, and substitutions included in the spirit and the scope of the present disclosure.

Throughout the accompanying drawings, the same reference numerals will be used to describe the same components. Terms used in the specification, 'first', 'second', etc. can be used to describe various components, but the components are not to be construed as being limited to the terms. The terms are only used to differentiate one component from other components.

For example, the 'first' component may be named the 'second' component and the 'second' component may also be similarly named the 'first' component, without departing from the scope of the present disclosure. The term 'and/or' includes a combination of a plurality of items or any one of a plurality of terms.

Unless defined otherwise, it is to be understood that all the terms used in the specification including technical and scientific terms have the same meaning as those that are generally understood by those who skilled in the art to which the present disclosure pertains.

It must be understood that the terms defined by the dictionary are identical with the meanings within the context of the related art, and they should not be ideally or excessively formally defined unless the context clearly dictates otherwise.

Hereinafter, an apparatus and a method for controlling energy regeneration variably according to an embodiment of the present disclosure will be described in detail with reference to the accompanying drawings.

FIG. 1 is a configuration block diagram of an apparatus 100 for controlling energy regeneration variably according to an embodiment of the present disclosure. Referring to FIG. 1, the apparatus 100 for controlling energy regeneration variably includes a controller 110 configured to vary an energy regeneration stage to perform a regenerative braking control, a generator 160 configured to generate power according to the regenerative braking control, a battery 120 configured to store the generated power, a power converter 130 configured to convert the power generated by the generator 160 and supply the converted power to the battery 120, and the like.

The controller 110 senses an event for the energy regeneration stage, and varies the energy regeneration stage according to the event to perform the regenerative braking control.

The battery 120 is constituted by battery cells which are connected in series and/or in parallel, in which the battery cell may be a high voltage battery for an electric vehicle such as a nickel metal battery cell, a lithium ion battery cell, a lithium polymer battery cell, and all solid-state batteries Generally, the high voltage battery is a battery used as a power source which moves the electric vehicle, which means a high voltage battery of 100 V or more. However, the exemplary embodiment of the present disclosure is not limited thereto, and therefore a low voltage battery may be used.

Examples of the electric vehicle include a hybrid electric vehicle (HEV hybrid electric vehicle), a plug-in hybrid electric vehicle (PHEV plug-in hybrid electric vehicle) and the like.

The power converter 130 serves to convert power from the battery 120 and supply the converted power to the driving motor 140, or convert power generated from a driving motor 140 and supply the converted power to the battery 120 and store the converted power in the battery 120. The power converter 130 may include an inverter, a converter, and the like.

The inverter uses a pulse width modulation (PWM) inverter, which is a voltage type inverter, but the present disclosure is not limited thereto. A current type inverter in which some of the components thereof are modified may be applied. The PWM inverter simultaneously controls a voltage and a frequency of the rectified DC voltage using the pulse width modulation (PWM) control method. The converter may be a low voltage direct current-direct current converter (LDC), a high voltage DC-DC converter (HDC), or the like.

The driving motor 140 is driven by receiving power from the battery 120. During the regenerative braking, the driving motor 140 produces power by rotating in a reverse direction and stores the produced power in the battery 120 through the power converter 130.

The paddle shifter 150 (e.g., a steering-wheel paddle, regenerative paddles, a shift-by-wire gear selector, etc.) serves to control the energy regeneration stage through the paddle shift. That is, a driver manually operates the paddle shifter provided on a steering wheel or the like to perform paddle shift [+] input and [−] input.

A generator 160 is interlocked with a crankshaft of an engine 10 and a belt 161 and is operated as an electric motor when the engine 10 is started. Of course, when the engine 10 is driven, the generator 160 may be operated as a generator.

In general, the electric vehicle (particularly, hybrid electric vehicle) is classified into a series type, a parallel type, a hybrid type, and the like according to the power transmission system of the vehicle, and is classified into a soft type, a middle type, and a hard type according to a power sharing ratio between the engine 10 and the driving motor 140. Here, the series type has a similar structure to a general electric vehicle, the driving force is obtained from the motor, and the engine is mounted as a power generation supplementing the shortcomings of the electric vehicle having a short traveling distance. The parallel type is based on the traveling by the engine, and assists the driving force by the motor during a low speed operation with low efficiency of the engine or during acceleration. The parallel type can improve the entire fuel efficiency of the driving system by using an optimum operating region of the engine and the motor, and improve the fuel efficiency by recovering power to the motor during the braking.

The engine 10 may be continuous a variable valve timing (CVVT) engine, application (double over head camshaft) engine, a continuous valve timing (CVT) engine, a gasoline direct injection (GAI) engine, and a multi point injection (MPI) engine that use gasoline as fuel, a common rail direct injection (CRDI) engine, a high direction turbointercooler (HTI) engine, and a variable geometry turbocharge (VGT) engine that use diesel as fuel, and a liquid propane injection (LPi) engine that uses gas as fuel.

In addition, a brake 20 for performing braking, an accelerator 30 for acceleration traveling, and the like may be further included. These brake 20, the accelerator 30 and the like are concepts including a pedal, a hydraulic system, and the like.

Figure 2:
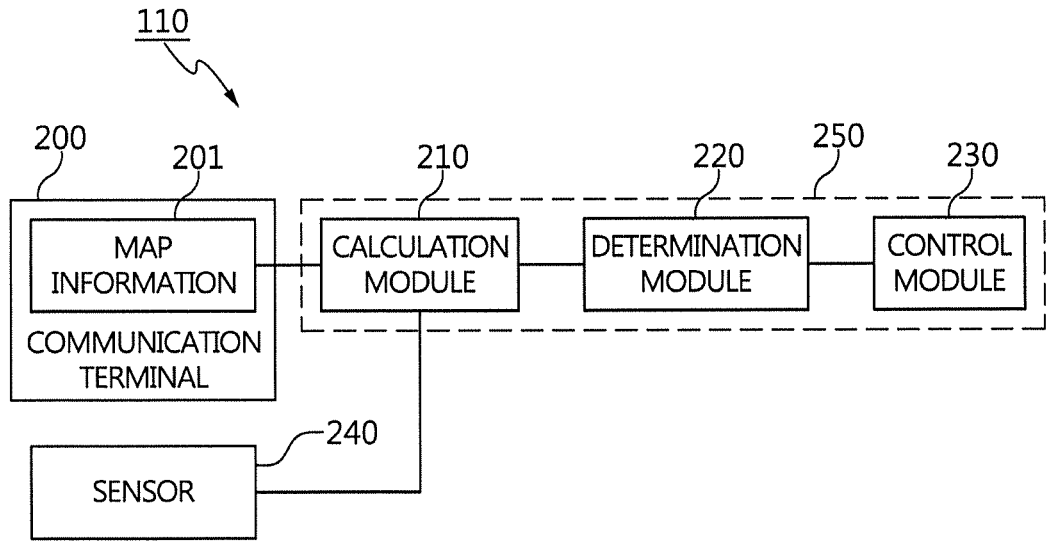
FIG. 2 is a detailed configuration block diagram of a controller illustrated in FIG. 1.

FIG. 2 is a detailed configuration block diagram of a controller 110 illustrated in FIG. 1. Referring to FIG. 2, the controller 110 includes a processor 250, which has an associated non-transitory memory storing software instructions which, when executed by the processor 250, provides the functionalities of a calculation module 210, a determination module 220, and a control module 230. Here, the calculation module 210 of the processor 250 may be configured to calculate a predicted collision time during coasting, the determination module 220 of the processor 250 may be configured to determine the predicted collision time by comparing the predicted collision time with a preset reference value, and the control module 230 of the processor 250 may be configured to automatically vary the preset energy regeneration stage according to the determination result to perform the corresponding regenerative braking control.

The calculation module 210 of the processor 250 acquires map information 201 by using a communication terminal 200, and calculates the predicted collision time during the coasting through the map information. At this time, the communication terminal 200 may be a navigation terminal, a smart phone, or the like. In addition, the map information includes information of speed cameras and speed bumps that may be present in a path that the vehicle travels with. Accordingly, the calculation module 210 calculates the collision time as follows.

$$\text{Collision time} = \text{Vehicle-to-Vehicle Distance (Event-to-Event Distance)}/\text{Vehicle-to-Vehicle speed [Specific-Event Vehicle Speed} - \text{Subject Vehicle Speed]} \quad \text{[Equation 1]}$$

In the above Equation, the collision time represents the predicted collision time, the vehicle-to-vehicle speed represents a difference between a specific vehicle speed and a vehicle speed that is preset by an event (e.g., a speed camera, a speed bump, etc.), and the vehicle-to-vehicle distance represents a distance between the occurrence information of the event and the location information of the vehicle.

Of course, the event-to-event distance is also possible by integrating the vehicle speed or the location information of the vehicle.

Particularly, the above event is an upward event that upwardly moves the energy regeneration stage, and becomes an event of the speed camera and/or speed bump about 2 km before. In this case, the event-specific vehicle speed may be 60 to 110 kph or the like in the case of the speed camera, or about 30 kph in the case of the speed bump.

In addition, in the calculation of the vehicle-to-vehicle speed, in the case of the speed camera, 60 kph (specific vehicle speed)−100 kph (subject vehicle speed)=−40 kph. Meanwhile, in the case of the speed bump, 30 kph (specific vehicle speed)−100 kph (subject vehicle speed)=−70 kph. Of course, it is also possible to take an absolute value for these calculation result values.

Alternatively, a calculation module 210 may use at least one sensor 240 to calculate the collision time. At this time, the sensor 240 may be a rider, a radar, or the like. That is, when the sensor 240 senses the vehicle-to-vehicle distance and the vehicle-to-vehicle speed to generate information, the calculation module 210 uses the information to calculate the collision time. In this case, the collision time is as the following Equation 2.

$$\text{Collision Time} = \text{Vehicle-to-Vehicle Distance}/\text{Vehicle-to-Vehicle Speed} \quad \text{[Equation 2]}$$

In the above Equation 2, the collision time is a predicted collision time, the vehicle-to-vehicle speed represents a difference between a speed preset by a specific object, such as the speed camera and/or the speed bump, and a speed of the vehicle, and the vehicle-to-vehicle distance represents the distance between the specific object and the vehicle.

The term "~module", or the like, described in the specification means a unit of processing at least one function or operation and may be implemented by hardware or software or a combination of hardware and software. The hardware may be implemented as an application specific integrated circuit (ASIC), digital signal processing (DSP), a programmable logic device (PLD), a field programmable gate array (FPGA), a processor, a controller, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

Figure 3:
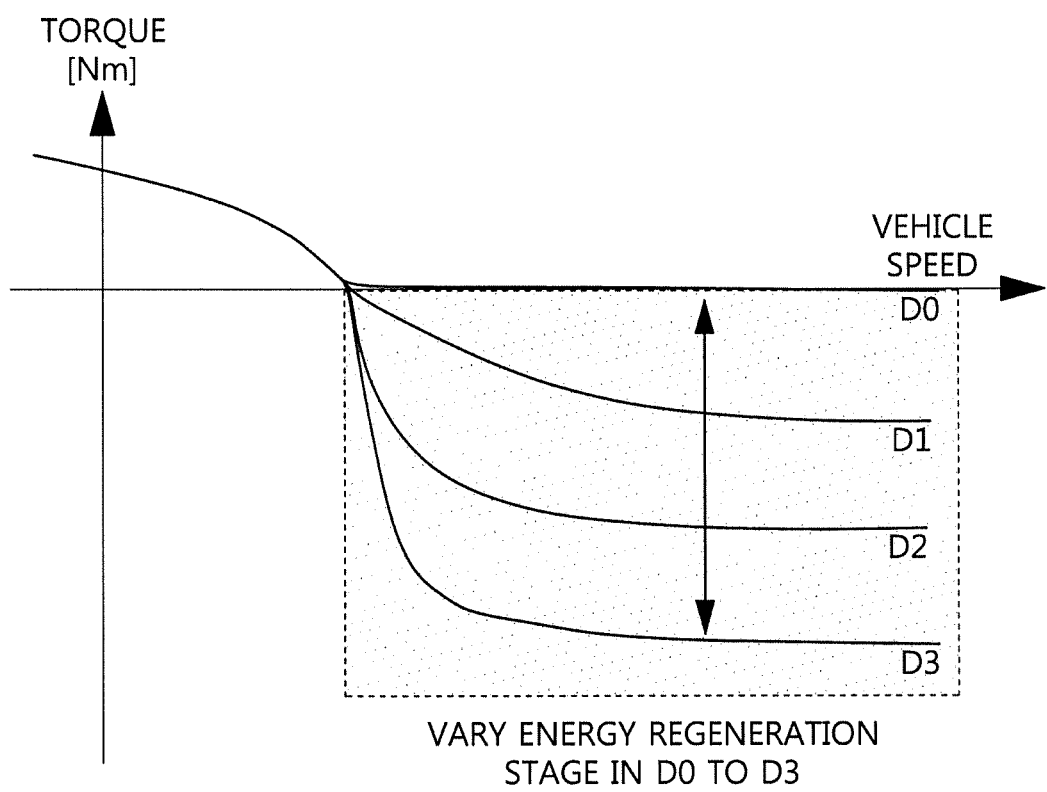
FIG. 3 is a conceptual diagram of controlling energy regeneration variably according to an embodiment of the present disclosure.

FIG. 3 is a conceptual diagram of controlling energy regeneration variably according to an embodiment of the present disclosure. Referring to FIG. 3, an x axis represents the vehicle speed and a y axis represents a torque Nm of the motor. Further, depending on the torque and the vehicle speed, the energy regeneration stage is generated in advance as a look-up table. Here, D0 to D3 indicate the state of the paddle shift.

Figure 4:
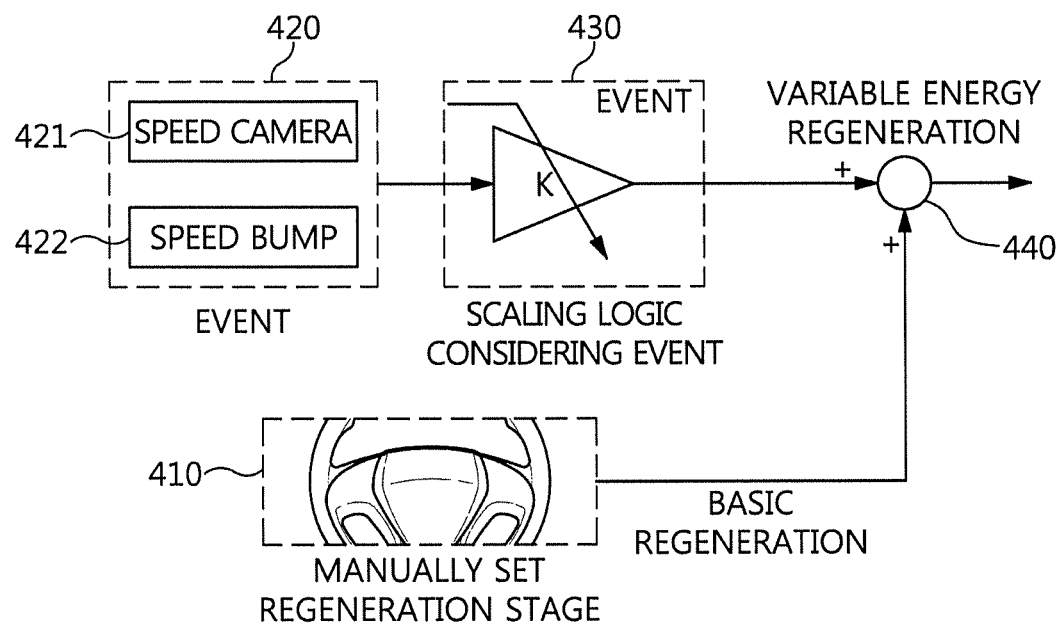
FIG. 4 is a logic diagram of controlling energy regeneration variably according to an embodiment of the present disclosure.

FIG. 4 is a logic diagram of controlling energy regeneration variably according to an embodiment of the present disclosure. That is, FIG. 4 is a conceptual diagram incorporating the automatic variable of the energy regeneration stage according to the event and the manual regeneration of the energy regeneration stage according to the paddle shifter (150 in FIG. 1). Referring to FIG. 4, when an event 420 occurs according to the existence of a speed camera 421 and/or a speed bump 422 according to an embodiment of the present disclosure, the corresponding energy regeneration stage is automatically calculated according to a scaling logic 430 considering the event 420. Meanwhile, when the driver manually sets the energy regeneration stage (410) at his/her own will, the corresponding energy regeneration stage is manually calculated accordingly. These two energy regeneration stages are summed by a summer 440 to generate a final energy regeneration stage.

Figure 5:
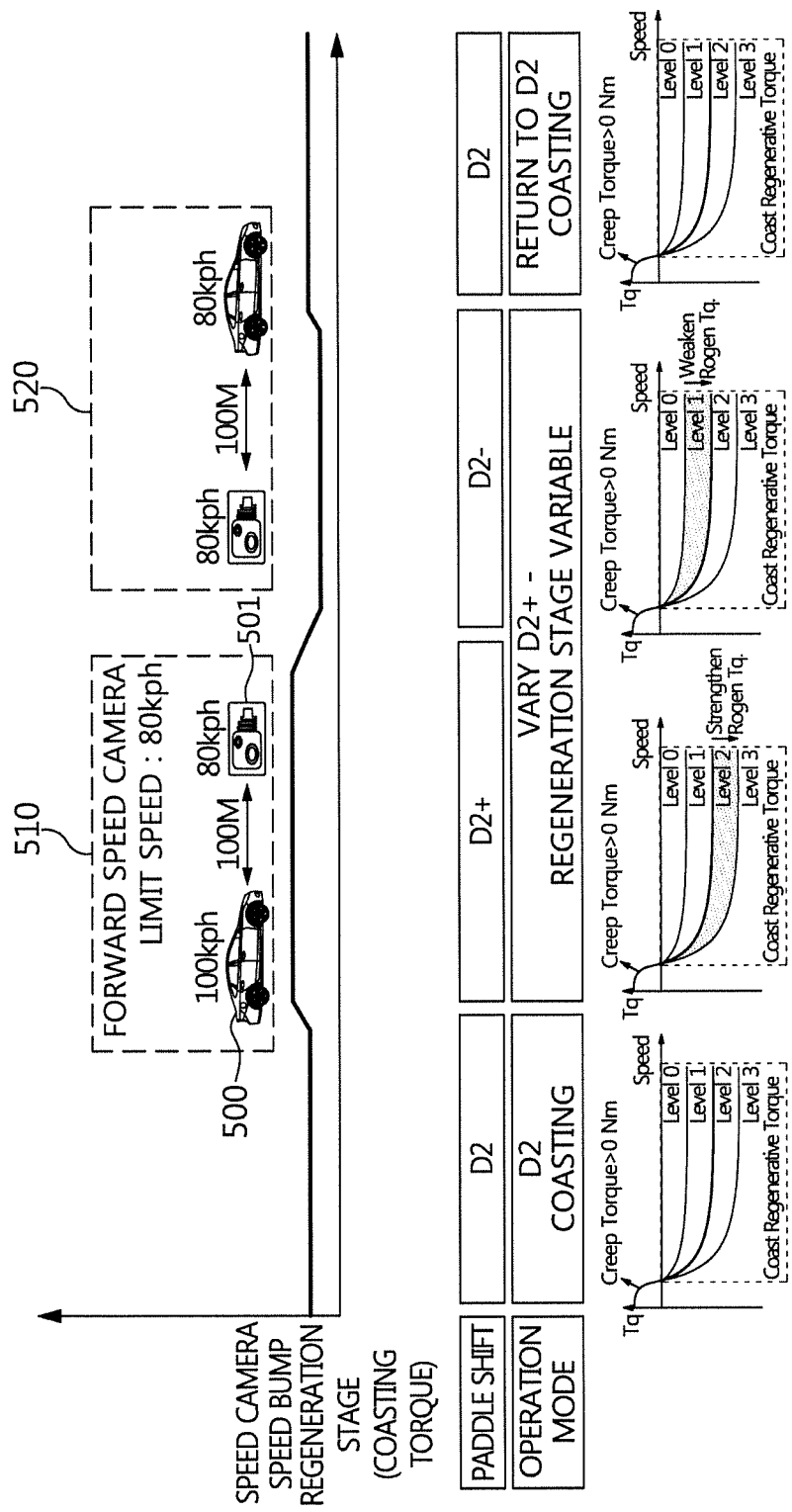
FIG. 5 is a conceptual diagram of controlling energy regeneration variably using map information according to an embodiment of the present disclosure.

FIG. 5 is a conceptual diagram of controlling energy regeneration variably using map information according to an embodiment of the present disclosure. Referring to FIG. 5, there is shown an operation mode according to an upward event 510 that upwardly moves the energy regeneration stage and a downward event 520 that downwards the energy regeneration stage. Of course, the paddle shift may also be reflected as described above.

In the case of the upward event 510, a vehicle 500 is located at about 100 M from a forward speed camera 501. At this time, a current speed of the vehicle is about 100 kph, and a speed limit is about 80 kph. In this case, if the energy regeneration stage is operated at Level 2, and when D2+ is input by the paddle shift reflecting the driver's will, the energy regeneration stage is raised from Level 2 to Level 3.

In contrast, in the case of the downward event 520, a distance difference between the vehicle 500 and the forward speed camera 501 is about 100 M in the state in which the vehicle passes through the forward speed camera. In this case, if the energy regeneration stage is operated at Level 2, and when D2− is input by the paddle shift, the energy regeneration stage is lowered from Level 2 to Level 1.

In FIG. 5, the case where a speed camera and a speed bump are present on the map information has been described. However, the method of using a sensor (240 in FIG. 2) may be similarly applied.

Figure 6:
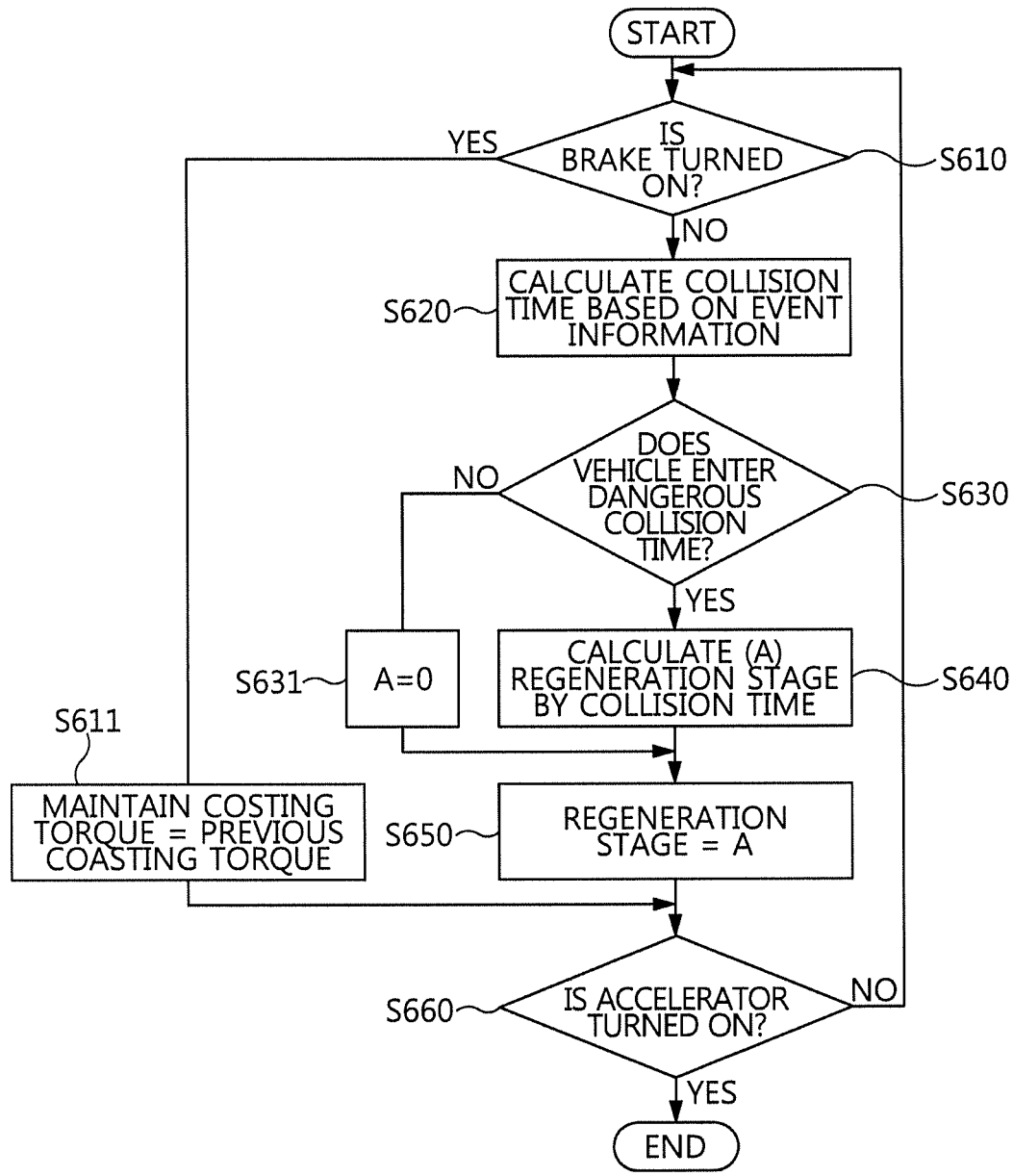
FIG. 6 is a flowchart showing a regeneration stage variable control when a vehicle is entered under a danger distance and a collision time using map information providing means according to an embodiment of the present disclosure.

FIG. 6 is a flowchart showing a regeneration stage variable control when a vehicle is entered under a danger distance and a collision time using map information providing means according to an embodiment of the present disclosure. Referring to FIG. 6, the controller 110 confirms whether the brake (20 in FIG. 2) is turned on during the traveling of the vehicle (step S610).

When the brake 20 is turned on in step S610, the current coasting torque maintains the previous coasting torque (step S611). In contrast, in step S610, if the brake 20 is not turned on, the predicted collision time through the event is calculated, and it is determined whether the predicted collision time enters the preset dangerous collision time (steps S620 and S630). In other words, it is determined whether the predicted collision time is smaller than the preset reference value.

In step S630, if it enters the dangerous collision time, the energy regeneration stage is calculated based on the collision time, which is set to be "A" which is the current energy regeneration stage is set to "A" (steps S640 and S650). In other words, as shown in FIG. 5, for example, the current energy regeneration stage A is operated at Level 2, and if D2− is input, the energy regeneration stage is lowered from Level 2 to Level 1. Of course, if D2+ is input, the energy regeneration stage is raised from Level 2 to Level 3.

On the other hand, if it does not enter the dangerous collision time in step S630, the current state is reset (step S631). The reset means changing the current energy regeneration stage A to Level 0. In other words, if the current regeneration stage is Level 2, it is changed to Level 0.

Thereafter, it is confirmed whether the accelerator for accelerating the vehicle is turned on (step S660). As the confirmation result, if the accelerator is turned on, the procedure ends. On the other hand, if the accelerator is not turned, the procedure proceeds to step S610.

Meanwhile, the steps of the method or the algorithm described in connection with the embodiments proposed herein may be directly implemented in a program command form that may be executed by various computer means to be recorded in a computer-readable medium. The computer readable medium may include a program (instruction) code, a data file, a data structure, or the like, alone or a combination thereof.

The program (instruction) code recorded in the computer-readable recording medium may be designed and constituted especially for the present disclosure, or may be known to those skilled in a field of computer software. Examples of the computer-readable recording medium include magnetic media such as a hard disk, a floppy disk and a magnetic tape, optical media such as CD-ROM, DVD, Blu-ray and the like, RAM), semiconductor storage elements, such as flash memory, and the like, for example, specifically configured to store and execute the program (instruction) code.

According to the present disclosure, it is possible to perform the variable control based on the deceleration event discrimination using the map information input as well as the driver's operation. That is, both the manual variable control and the automatic variable control of the regeneration stage are possible.

Another effect of the present disclosure is that the unnecessary paddle shift input, accelerator pedal sensor (APS), and brake operations can be minimized, and thus driving convenience and/or fuel efficiency on a real road is improved.

Examples of the program (instruction) code may include machine language codes such as being made by compilers as well as high-level language codes capable of being executed by computers using interpreters, or the like. The hardware device may be constituted to be operated as one more software modules in order to perform the action according to the present disclosure, and vise versa.

What is claimed is:

1. An apparatus for controlling energy regeneration variably, comprising:
   a controller configured to change a preset energy regeneration stage variably to a corresponding regenerative braking control by sensing an event for an energy regeneration stage and perform the corresponding regenerative braking control; and
   a generator configured to generate power according to the regenerative braking control,
   wherein the preset energy regeneration stage is generated in advance as a look-up table depending on a torque and a vehicle speed.

2. The apparatus of claim 1, wherein the event is an upward event that upwardly moves the energy regeneration stage or a downward event that downwardly moves the energy regeneration stage.

3. The apparatus of claim 2, wherein during the upward event, the energy regeneration stage varies when a predicted collision time during coasting is smaller than a preset reference value.

4. The apparatus of claim 3, wherein the predicted collision time is determined by using a vehicle-to-vehicle speed representing a difference between a speed preset by a specific object and a speed of a vehicle and a vehicle-to-vehicle distance representing a distance between the specific object and the vehicle.

5. The apparatus of claim 4, wherein the specific object is a speed camera or a speed bump.

6. The apparatus of claim 5, wherein the specific object is a specific object on map information acquired by a communication terminal or a specific object acquired by a sensor.

7. The apparatus of claim 3, wherein the predicted collision time is determined by using a vehicle-to-vehicle speed representing a speed difference between a specific vehicle speed and a vehicle speed which is preset by the event and a vehicle-to-vehicle distance representing a distance between occurrence information of the event and location information of the vehicle.

8. The apparatus of claim 1, wherein the generator is a generator or a driving motor.

9. The apparatus of claim 1, wherein the energy regeneration stage varies by reflecting an adjustment value according to an operation of a paddle shifter for manually adjusting the energy regeneration stage.

10. The apparatus of claim 1, wherein the controller controls the vehicle to travel at a preset specific limit vehicle speed when the event is sensed.

11. A method for controlling energy regeneration variably, comprising:
   changing, by a controller, a preset energy regeneration stage variably to a corresponding regenerative braking control by sensing an event for an energy regeneration stage and performing the corresponding regenerative braking control; and generating, by a generator, power according to the regenerative braking control,
wherein the preset energy regeneration stage is generated in advance as a look-up table depending on a torque and a vehicle speed.

12. The method of claim 11, wherein the event is an upward event that upwardly moves the energy regeneration stage or a downward event that downwardly moves the energy regeneration stage.

13. The method of claim 12, wherein during the upward event, the changing of the preset energy regeneration stage is performed when a predicted collision time during coasting is smaller than a preset reference value.

14. The method of claim 13, wherein the predicted collision time is determined by using a vehicle-to-vehicle speed representing a difference between a speed preset by a specific object and a vehicle speed and a vehicle-to-vehicle distance representing a distance between the specific object and the vehicle.

15. The method of claim 14, wherein the specific object is a speed camera or a speed bump.

16. The method of claim 15, wherein the specific object is a specific object on map information acquired by a communication terminal or a specific object acquired by a sensor.

17. The method of claim 13, wherein the predicted collision time is determined by using a vehicle-to-vehicle speed representing a speed difference between a specific vehicle speed and a vehicle speed which is preset by the event and a vehicle-to-vehicle distance representing a distance between occurrence information of the event and location information of the vehicle.

18. The method of claim 11, wherein the generator is a generator or a driving motor.

19. The method of claim 11, wherein the changing of the preset energy regeneration stage is made by reflecting an adjustment value according to an operation of a paddle shifter for manually adjusting the energy regeneration stage.

20. The method of claim 11, wherein in the changing of the preset energy regeneration stage, the vehicle is controlled, by the controller, to travel at a preset specific limit vehicle speed when the event is sensed.

* * * * *